US006666769B2

(12) United States Patent
Stronach

(10) Patent No.: US 6,666,769 B2
(45) Date of Patent: Dec. 23, 2003

(54) MULTIMEDIA WAGERING SYSTEM

(75) Inventor: Andrew M. Stronach, Ontario (CA)

(73) Assignee: Futuristic Entertainment, Inc., Aurora (CA)

( * ) Notice: Subject to any disclaimer, the term of this patent is extended or adjusted under 35 U.S.C. 154(b) by 0 days.

(21) Appl. No.: 09/984,649

(22) Filed: Oct. 30, 2001

(65) Prior Publication Data

US 2002/0058548 A1 May 16, 2002

Related U.S. Application Data

(63) Continuation of application No. PCT/CA00/00443, filed on May 1, 2000.

(60) Provisional application No. 60/131,806, filed on Apr. 30, 1999.

(51) Int. Cl.[7] .................................................. A63F 13/00

(52) U.S. Cl. ............................................ 463/40; 700/93

(58) Field of Search .............................. 463/16, 25, 29, 463/39, 40; 700/90.93

(56) References Cited

U.S. PATENT DOCUMENTS

| | | | | | |
|---|---|---|---|---|---|
| 5,743,525 | A | * | 4/1998 | Haddad | 273/138.1 |
| 5,830,067 | A | * | 11/1998 | Graves et al. | 463/40 |
| 5,842,921 | A | * | 12/1998 | Mindes et al. | 463/16 |
| 6,004,211 | A | * | 12/1999 | Brenner et al. | 463/25 |
| 6,011,485 | A | * | 1/2000 | Wicks | 340/7.23 |
| 6,033,308 | A | | 3/2000 | Orford et al. | 463/28 |
| 6,273,820 | B1 | * | 8/2001 | Haste, III | 463/40 |
| 6,358,150 | B1 | * | 3/2002 | Mir et al. | 463/25 |

FOREIGN PATENT DOCUMENTS

| | | |
|---|---|---|
| WO | WO 00/25876 | 5/2000 |

OTHER PUBLICATIONS

PCT Search Report for International Patent Application No. PCT/CA 00/00443, dated Sep. 26, 2000.

PCT Notification of Transmittal of the International Preliminary Examination Report Application No. PCT/CA 00/00443, dated Jul 31, 2001.

* cited by examiner

*Primary Examiner*—Michael O'Neill
*Assistant Examiner*—Aaron L Enatsky
(74) *Attorney, Agent, or Firm*—Mark A. Litman & Assoc. P.A.

(57) ABSTRACT

A multimedia wagering system consists of a race providing system for facilitating wagering on race events, and a plurality of multimedia wagering terminals in communication with the race providing system for wagering on the race events. The race provider includes means for selecting race events for wagering. The wagering terminal includes a multimedia display for displaying the selected race events, a user interface for placing a wager on the selected race event, payout means for providing a payout on the selected race events, and data processing means in communication with the multimedia display, the user interface and the payout means for facilitating wagering on the selected race events. The data processing means includes a handicapping receiver for receiving handicapping data from the race providing system, and odds receiver for receiving odds data from the race providing system, and a wagering processor in communication with the handicapping receiver and the odds receiver for selecting one or more racing candidates for the wager in accordance with the received handicapping data and the received odds data.

48 Claims, 7 Drawing Sheets

MULTIMEDIA WAGERING SYSTEM

This application claims the benefit of PCT Application No. PCT/CA00/00443, filed May 1, 2000 and U.S. Provisional Application No. 60/131,806 filed Apr. 30, 1999, the contents of which are incorporated by reference.

This is a Continuation of International Application No. PCT/CA00/00443 filed May 1, 2000 which designated the U.S. and was published under PCT Article 21(2) in English.

FIELD OF THE INVENTION

The present invention relates to a video gaming system. In particular, the present invention relates to a multimedia system for facilitating wagering on sporting events.

BACKGROUND OF THE INVENTION

Wagering on racing events, such as horse races and dog races, typically takes the form of either fixed odds wagering or parimutuel wagering. Fixed odds wagering is a system by which the return for a particular wager is determined in accordance with the payout odds assigned to the associated bet. Fixed odds wagering is popular from the perspective of wager recipients (eg. betting parlours) since it places a limit on the magnitude of the payout in the event of a win. Fixed odds wagering is also popular from the perspective of wagerors since it provides a measure of certainty on the possible payout. However, as the odds assigned to a particular bet can diminish in accordance with the total amount wagered on the bet, fixed odds wagering may not be particularly attractive to some wagerors since the payout odds for their bet may diminish in the minutes before the start of the sporting event.

Parimutuel wagering is a system by which a wagering pool is established for the receipt of bets, and the proceeds of the pool are divided amongst holders of winning tickets in accordance with the number of winning ticket holders and the magnitude of each wager. Parimutuel wagering is popular from the perspective of the wager recipients (eg. race track owners), since the recipient typically receives a fixed percentage of the pool prior to the payout to the winning ticket holders. Also, parimutuel wagering is popular from the perspective of the wageror since the return on a particular wager is proportional to the size of the wagering pool and, therefore, can exceed the fixed odds return of the bet. However, parimutuel wagering also suffers from a number of disadvantages.

Firstly, parimutuel wagering requires a knowledge of betting terminology (eg. win, place, show, triactor, exactor). Secondly, parimutuel wagering requires the wageror to be conversant with betting forms, and to have knowledge of race contestant handicapping. For example, for horse racing, successful handicapping requires a consideration of several factors, including track conditions, horse record, and jockey record for each contestant horse. Consequently, parimutuel wagering may not provide wager recipients with a significant return since novices may be intimidated by the knowledge required and either make only minimal wagers or no wagers at all. Therefore, attempts have been made to improve on the conventional fixed odds wagering and parimutuel wagering systems to encourage wagerors to place wagers.

For instance, Auto Tote Systems Inc. markets video terminals which remove the need for the wageror to interact with a human wager recipient. The video terminal consists of a touch-sensitive CRT display, a card reader, and a central processing unit in communication with the CRT display, the card reader and a remote wagering computer for processing desired wagers. To place a wager, the wageror purchases a wager card, inserts the wager card into the card reader, and then selects the desired track, the desired horse(s), the wager form (eg. win, place, show), and the amount of the wager. Although the video terminal allows the novice to conceal his/her lack of familiarity with betting terminology and handicapping, it does little to encourage the novice to make wagers.

Algie (U.S. Pat. No. 5,564,977) teaches a racetrack display system which attempts to encourage parimutuel wagering on horse races. The display system consists of central processing unit (CPU), a modem in communication with a central parimutuel computer system, and a number of LED display boards controlled by the CPU for displaying parimutuel data received from the parimutuel computer system. Typically the display system includes at least three LED display boards, each of which continuously displays a stream of parimutuel data for a respective time interval and then displays the parimutuel data in effect at the end of the respective time interval. In this manner, wagerors are able to make wagering decisions based on the historical trends in the odds of a particular bet, thereby adding a measure of stability and excitement to the wagering process. However, Algie still requires a significant level of knowledge in terms of betting terminology for users to place wagers, Also, in comparison to simpler electronic gaming machines, such as video poker games, Algie does little to encourage the use of the racetrack display system.

Orford (U.S. Pat. No. 6,033,308) teaches a combined perimutuel and fixed odds wagering system consisting of a number of betting terminals linked to a central processor for the receipt of parimutuel or fixed odds wagers, a parimutuel wager pool which receives the parimutuel wagers, and a fixed odds wager pool which receives the fixed odds wagers. The central processor sequentially opens and closes a succession of time periods during which fixed odds wagers are accepted from the betting terminals, and utilizes the liabilities arising from the wagers received by the parimutuel wager pool and the fixed odds wager pool to determine the fixed odds for each successive time period. By combining parimutuel and fixed odds wagering, the combined wagering system attempts to ameliorate some of the weaknesses of conventional parimutuel wagering systems. However, as the wageror must still have knowledge of betting terminology and handicapping, Orford does not appreciably encourage novices to make wagers.

Youbet.com maintains a web site which facilitates racetrack wagering over the Internet. Upon accessing the Youbet.com web site, the wageror is provided with a series of web pages which allow the wageror to select a racing event and to place a wager on the selected racing event. After a wager is placed, the web site provides the wageror with a steaming multimedia presentation of the selected racing event. Although the web site provides handicapping information for assisting the prospective wageror in placing wagers, the wageror must still have some knowledge of betting terminology and be able to make wagering decisions from the handicapping information. Further, the multimedia window used to display the selected racing event is typically quite small, being limited by the bandwidth of the connection to the Internet and traffic to the Youbet.com web site. Therefore, Youbet.com does little to create an incentive to place wagers. In addition, each wageror must establish an account with Youbet.com before placing a wager, thereby creating an obstacle to the wagering process.

Brenner (U.S. Pat. No. 5,830,068) teaches an interactive wagering system and method for off-track wagering. The wagering system consists of a number of totalisators for generating odds in real time on wagers placed on racing events at different racetracks, a number of home-based user terminals in communication with the totalisators over telephone lines to allow wagerors to select racing events and to place wagers on the selected racing events. Each terminal includes a display device which displays menus for allowing the wagerors to select the racing events and to place the wagers on the racing events. The display device also displays information on upcoming racing events, and allows the user to view the racing events in real time or to view taped races. The user terminal also includes a card reader configured for receiving an electronic or magnetic card for storing the wageror's account information. Although Brenner facilitates wagering through a series of linked menus, and provides handicapping information for assisting the prospective wageror in placing wagers, the wageror must still have some knowledge of betting terminology and be able to make wagering decisions from the handicapping information. Further, the quality of the displayed racing events is limited by he need to compress each multimedia race presentation prior to transmission at each user terminal, and the need to simultaneously service multiple users with different multimedia race presentations. In addition, each wageror must establish an account with one of the totalisators before placing a wager, thereby creating an obstacle to the wagering process.

Therefore, there remains a need for a wagering system and method which encourages wagering on racing events.

SUMMARY OF THE INVENTION

According to the invention, there is provided a multimedia wagering system and method which addresses deficiencies of the prior art wagering systems.

The multimedia wagering system, according to a first aspect of the present invention, includes a race providing system for facilitating wagering on race events, and a plurality of multimedia wagering terminal in communication with the race providing system for wagering on the race events. The race provider includes means for selecting race events for wagering. The wagering terminal includes a multimedia display for displaying the selected race events, a user interface for placing a wager on the selected race event, payout means for providing a payout on the selected race events, and data processing means in communication with the multimedia display, the user interface and the payout means for facilitating wagering on the selected race events.

The multimedia wagering method, according to a first aspect of the present invention, includes the steps of (1) providing a race providing system for facilitating wagering on race events; (2) providing a plurality of multimedia wagering terminals, each being configured for displaying the race events and for providing a payout on the race events; (3) at the race providing system, selecting one of the race events and transmitting to each wagering terminal a notice of the selected one race event; (4) during a wagering period for the selected race event, receiving from at least one of the wagering terminals a wager on the selected race event; (5) subsequent to the wagering period, displaying on the at least one wagering terminals the selected race event; and (6) subsequent to the selected race event, providing the payout in accordance with each received wager and the outcome of the selected race event.

According to a second aspect of the present invention, there is provided a multimedia wagering terminal which includes a multimedia display for receiving transmissions of race events from a remote race providing system, a user interface for placing a wager on elected race events, and payout means for providing a payout on the wagered race events. The wagering terminal is configured for providing the wager in a single predetermined wager form, and includes data processing means in communication with the multimedia display, the user interface and the payout means for facilitating wagering on the elected race events with the race providing system.

According to a third aspect of the present invention, there is provided a multimedia wagering terminal which includes a multimedia display for receiving transmissions of race events from a remote race providing system, a user interface for placing a wager on elected race events, and payout means for providing a payout on the wagered race events, and data processing means in communication with the multimedia display, the user interface and the payout means for facilitating wagering on the elected race events with the race providing system. The data processing means includes a handicapping receiver for receiving handicapping data from the race providing system, an odds receiver for receiving odds data from the race providing system, and a wagering processor in communication with the handicapping receiver and the odds receiver for selecting one or more racing candidates for the wager in accordance with the received handicapping data and the received odds data.

In a preferred implementation of the invention, the race providing system includes feeds from a number of different race tracks, and a database of previously run race events so as to provide the wagering terminals with a continuous succession of race events, even when no live race events are pending. Since the race providing system selects the race event to be displayed next, each wagering terminal is configured for preventing a user selection of the race events. Consequently, each wagering terminal displays the same race event, thereby reducing multimedia bandwidth requirements, increasing multimedia display quality and thereby increasing the incentive for wagering. Further, each wagering terminal is configured for providing the wager in only a single predetermined wager form. The predetermined wager form is prominently displayed on the wagering terminal, using words which explain the wager without recourse to typical betting terminology.

The data processing means includes a handicapping receiver for receiving handicapping data from the race providing system, an odds receiver for receiving odds data from the race providing system, and a wagering processor in communication with the handicapping receiver and the odds receiver for selecting one or more racing candidates for the wager in accordance with the received handicapping data and the received odds data. The wagering processor is configured for providing the wager in the single predetermined wager form assigned to the wagering terminal. However, in another implementation, each wagering terminal is configured for providing the wager in one of a number of different predetermined wager forms, and the wagering processor is configured for facilitating placement of the wager in accordance with a user-selected one of the predetermined wager forms.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
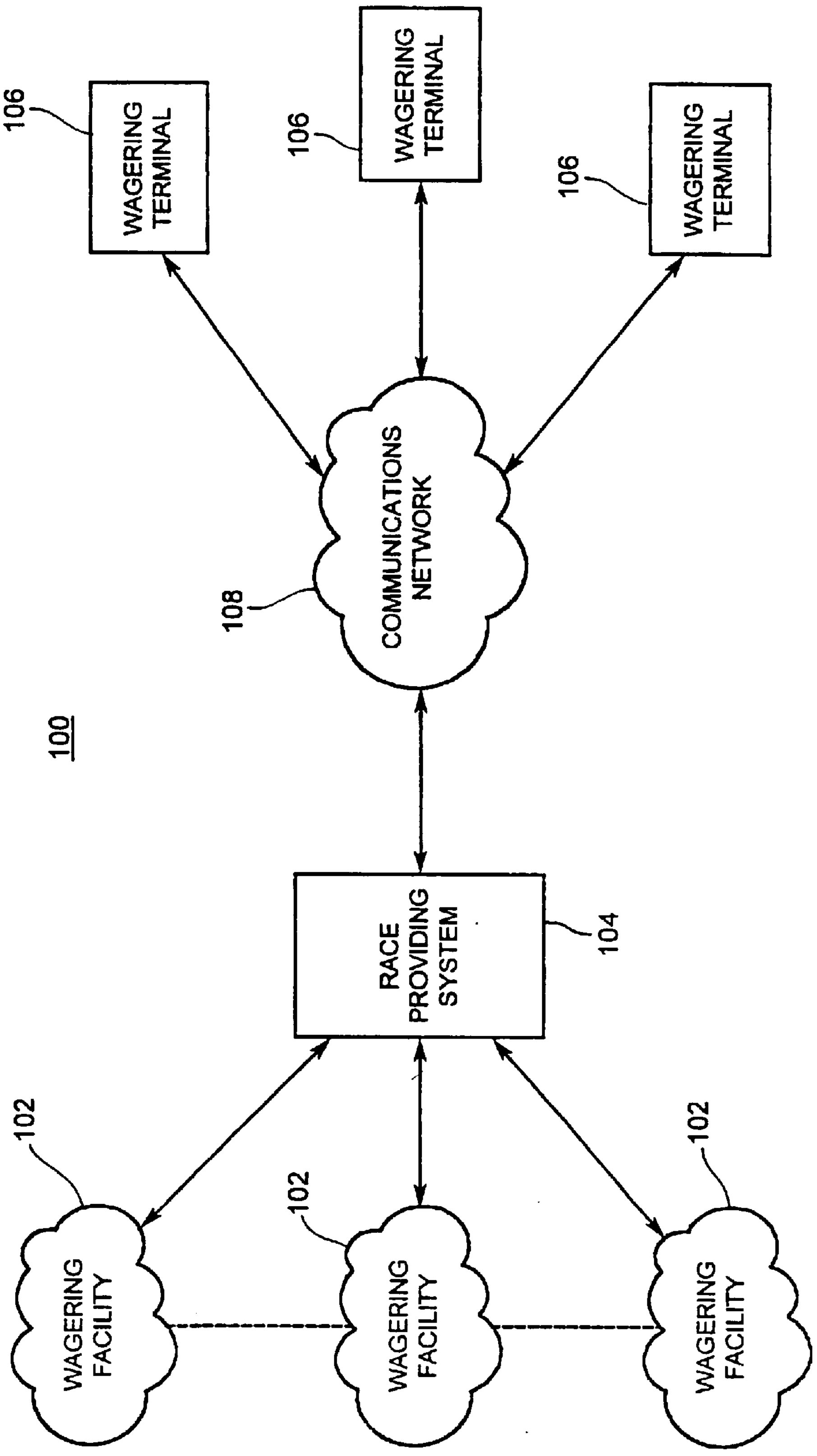
FIG. 1 is a schematic view of the multimedia wagering system, according to the present invention, depicting the race providing system and the multimedia wagering terminals.

Turning to FIG. 1, a multimedia wagering system, denoted generally as 100, is shown comprising a plurality of wagering facilities 102, a race providing system 104 in communication with the wagering facilities 102, a plurality of multimedia wagering terminals 106, and a communications network 108 for facilitating communication between the race providing system 104 and the wagering terminals 106. Preferably, the communications network 108 comprises a closed network, however the communications network may instead comprise an open network, such as the Internet, if the open network has sufficient bandwidth for adequately servicing the multimedia wagering terminals 106.

Typically, each wagering facility 102 is associated with one or more race tracks, and provides the race providing system 104 with racing information, such as the names and post positions of the race candidates (eg. horse, dog) running in each race event at each associated race track. The wagering facilities 102 also provide the race providing system 104 with odds information for each race candidate, betting pool information on the size of the betting pool associated with each racing event, and handicapping information, such as the weather conditions, and the jockey name, race candidate age, win record, and number of days since the last race event for each race candidate. In addition, the wagering facilities 102 provide the race providing system 104 with live video and audio feeds for each race event, and the race results at the end of each race event. Typically, the racing information, odds information, betting pool information, handicapping information, and the live race feeds are provided to the race providing system 104 over a telecommunications network, such as a wireless or cable telecommunications network.

Figure 2:
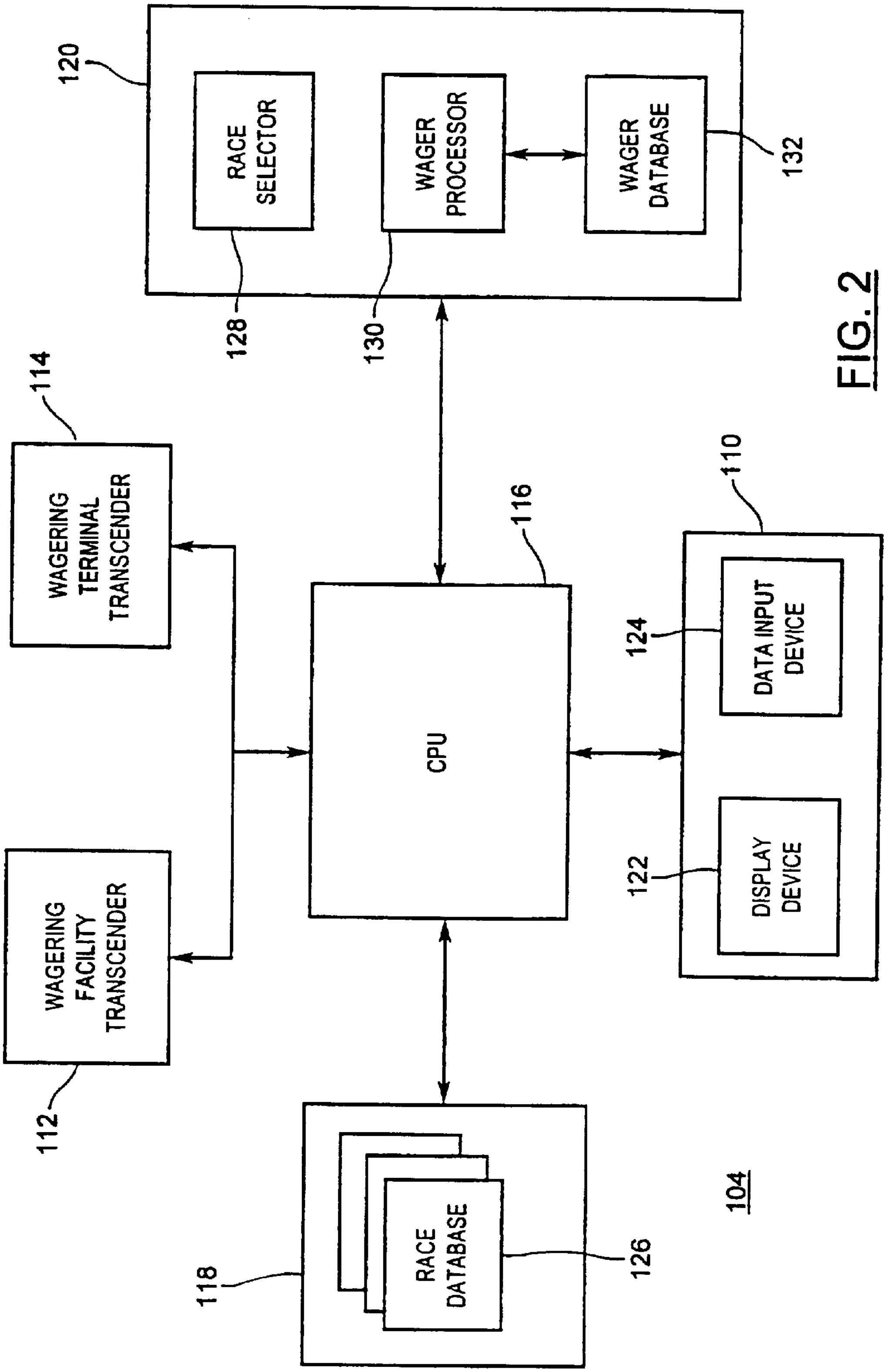
FIG. 2 is a schematic diagram of the race providing system shown in FIG. 1, depicting the FIG. 3 is a perspective view of one of the multimedia wagering terminals shown in FIG. 1, depicting the multimedia display, the user interface and the payout means.

As shown in FIG. 2, the race providing system 104 comprises a system user interface 110, a wagering facility transceiver 112 for communicating with the wagering facilities 102, a wagering terminal transceiver for communicating with the wagering terminals 106, a central processing unit (CPU) 116 in communication with the system user interface 110 and the wagering transceivers 112, 114, and a non-volatile memory 118 and a volatile memory (RAM) 120 in communication with the CPU 116. The user interface 110 comprises a data display device 122 for allowing the system user to view the racing information, odds information, betting pool information, handicapping information, and the-live race feeds. Preferably, the data display device 122 comprises a plurality of CRT displays which allow the system user to view the information and live race feeds received from each wagering facility 112 separately from the information and live race feeds received from the other wagering facilities 112. The user interface 110 also includes a data input device 124, such as a keyboard and/or mouse, for allowing the system user to enter control commands through the system user interface 110. The control commands include selection commands for selecting a race event to be displayed on the wagering terminals 106, and configuration commands for altering the predetermined wager form (discussed below) of any of the wagering terminals 106.

The non-volatile memory 118 includes a race database 126 which includes multimedia records for a number of previously run race events. Each multimedia record comprises (for each previously run race event) a video record of the race event, an audio record accompanying the video record, a track name record identifying the name and location of the race track where the race event was run, a race candidate record identifying the name of the race candidates, a jockey record identifying the name of the jockey associated with each race candidate, an odds record identifying the odds for each race candidate, a race outcome record identifying the names of the first four race candidates to finish the race event, a weather record identifying the weather conditions existing at the time the race event was run, and handicapping information existing at the time of the race event. Preferably, the multimedia records are stored in an array of high speed CD-ROM storage devices for quick access by the CPU 116.

The non-volatile memory 118 also include processor instructions for the CPU 116. The processor instructions establish in the RAM 120 a memory object defining a race selector 128 in communication with the race database 126, and a memory object defining a wager processor 130. The RAM 120 also includes a local wager database 132 in communication with the wager processor 130. The wager database 130 includes wagering records, each identifying the network address of a wagering terminal 106 and a wager transmitted from one of the wagering terminals 106.

To enhance revenues from the wagering process, the race selector 128 is configured to select between live feed race events received from the wagering facilities 102 and previously run race events stored in the race database 126, and to make a selection of one of the race events within a predetermined time frame. Preferably, the race selector 128 is configured to select the next live race event which is scheduled to run within the predetermined time frame and, if more than one live race event is scheduled to run within the predetermined time frame, to randomly select one of the live race events. The race selector 128 is also configured to randomly select one of the previously run race events if no live race is scheduled to be run within the predetermined time frame. In this manner, each wagering terminal 106 is continuously provided with a succession of race events upon which to wager. Further, the race selector 128 is configured to accept a selection command from the user interface 110, thereby allowing the system operator to specify a live race event or a previously run race event to run and override the default selection of the race selector 128.

The wager processor 130 is configured to receive wager information from the wagering terminals 106, to maintain the wager database 132 with the received wager information, and to signal the appropriate wagering terminals 106 to initiate payout to the wagerors for winning wagers. Where the wagering terminals 106 are used to place parimutuel wagers, the wager processor 130 is also configured to transmit the received wager information to the wagering facilities 102 for inclusion in the parimutuel pool, and to receive information from the wagering facilities 102 on the size of the parimutuel pool for calculation of the requisite payout.

Figure 3:
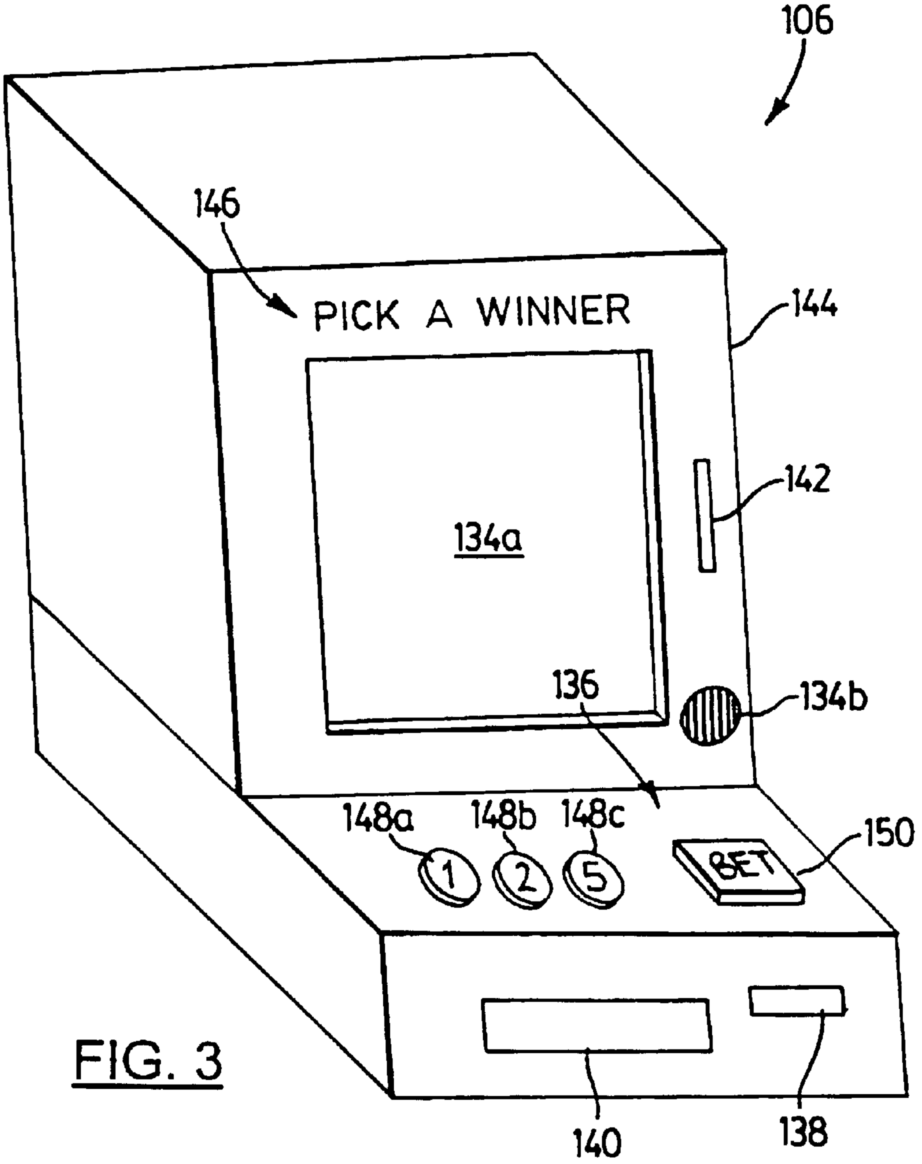

Turning now to FIG. 3, each multimedia wagering terminal 106 is shown comprising a multimedia display 134 for presenting the race events selected by the race providing system 104, a user interface 136 for placing wagers on the selected race events, a currency receiver 138 for receiving paper currency, a currency dispensing device 140 for dispensing cash winnings, a card read/write device 142 for receiving an electronic or magnetic-stripe card for retaining account information, and a housing 144 for retaining the multimedia display 134, the user interface 136, the currency receiver 138, the currency dispensing device 140, and the card read/write device 142. Typically, the electronic or magnetic-stripe card is issued by a betting parlour in which the wagering terminal 106 is located, and is encoded with information identifying the wageror's account balance. As will be apparent, the currency receiver 138 and the card read/write device 142 provide alternate mechanisms for crediting the wageror's account, and the currency dispensing device 140 and the card read/write device 142 provide alternate mechanisms for facilitating a payout for a winning wager. The wagering terminal 106 also includes a data processor 152 (discussed below) for facilitating wagering on the selected race events.

Preferably, the wagering terminal 106 is configured for providing a wager in only a single predetermined wager form, and the housing 144 includes a wager description 146, prominently displayed on the housing 144, identifying the wager form using words which explain the wager without recourse to typical betting terminology. Preferred wager descriptions 146 include "Pick A Winner", "Pick Two Any Order", "Pick Two Exact Order", "Pick Three Any Order", "Pick Three Exact Order", "Pick Four Any Order", "Pick Four Exact Order", "Pick Top Two", and "Pick Top Three".

The multimedia display 134 comprises a CRT display 134*a* for displaying a video stream of the selected race event, and a speaker 134*b* for playing an audio stream accompanying the video stream. Preferably, the CRT display 134*a* comprises a touch sensitive CRT display, including a touch sensitive membrane (not shown) in communication with the data processor 152 for manually selecting race candidates for the selected race event and for causing a cash payout of the wageror's winnings. The user interface 136 comprises a series of wager buttons 148 (shown individually as 148*a*, 148*b*, 148*c*) for accepting wagers in predetermined wager (eg. dollar) amounts. The user interface 136 also includes a bet submission button 150 for transmission of a wager to the race providing system 104. As will be apparent, since the race providing system 104 selects the race events for presentation on the wagering terminals 106, the user interface 136 does not include means for allowing wagerors to select a race event for wagering.

It should be understood that the configuration shown in FIG. 3 is only a preferred implementation for the wagering terminal 106, and that other configurations are also envisaged. For instance, in one variation, not shown, the wagering terminal 106 excludes the currency receiver 138 and the currency dispensing device 140, and maintains the card read/write device 142 as the sole means for receiving wagers and for providing payouts. In another variation, not shown, the user interface 136 includes a plurality of wager form buttons, each identifying a respective predetermined wager form (eg. Pick A Winner), for facilitating placement of the wager according to one of a plurality of wager forms. Other variations of the wagering terminal 106 will be apparent to those of ordinary skill.

Figure 4:
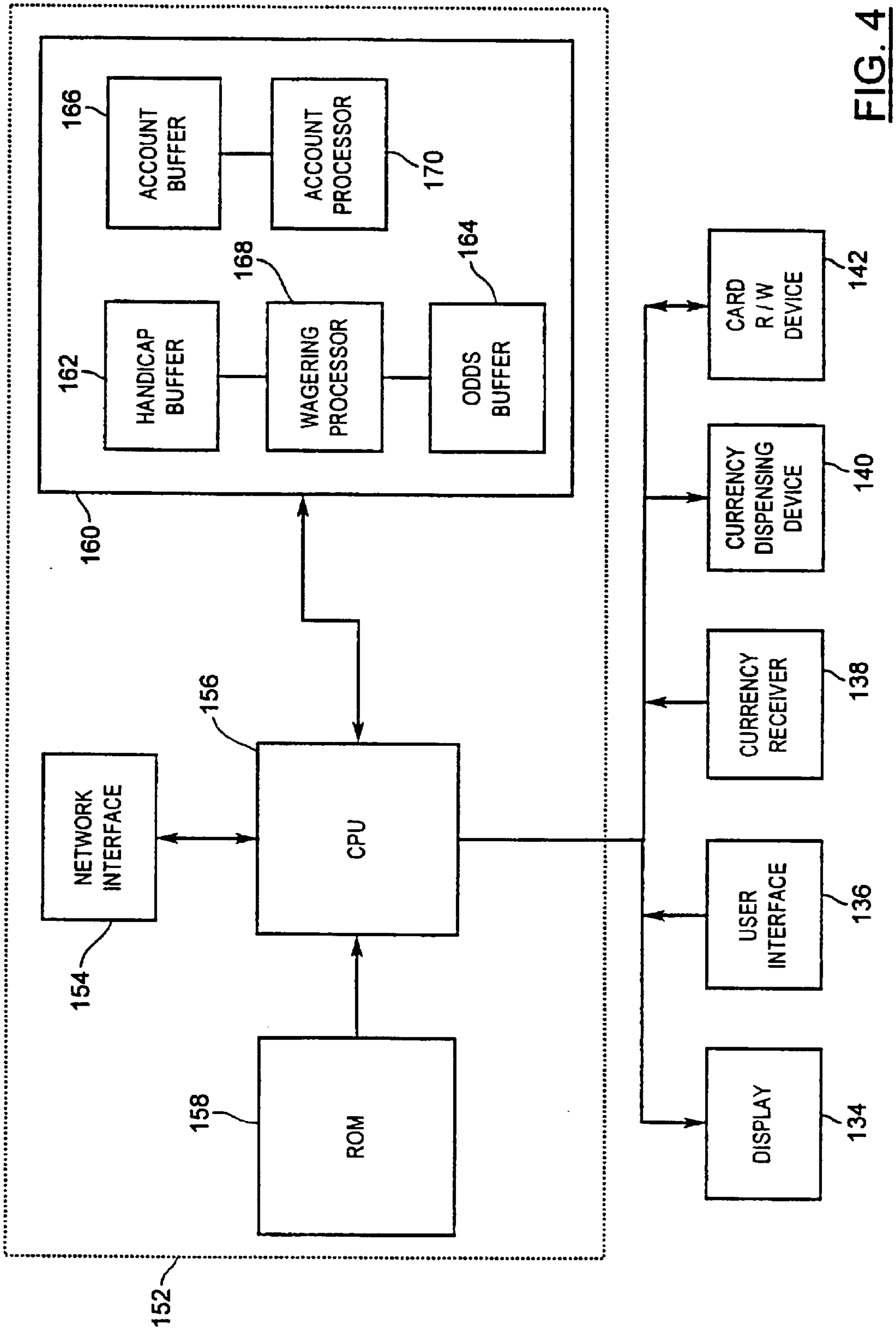
FIG. 4 is a schematic diagram of the multimedia wagering terminal shown in FIG. 3, depicting the handicapping receiver, the odds receiver, and the wagering processor.

As shown in FIG. 4, the data processor 152 comprises a network interface 154 for communicating with the race providing system 104 over the communications network 108, and a central processing unit (CPU) 156 in communication with the multimedia display 134, the user interface 136, the currency receiver 138, the currency device 140, the card read/write device 142, and the network interface 148. The data processor 152 also includes a non-volatile memory (ROM) 158 and a volatile memory (RAM) 160 in communication with the CPU 156.

The ROM 158 includes a handicapping buffer 162 for receiving handicapping data from the race providing system 104, an odds buffer 164 for receiving odds data from the race providing system 104, and an account buffer 166 for recording the monetary value of funds in the wageror's wagering account. As discussed above, typically the handicapping data includes information such as the weather conditions, and the jockey name, candidate age, win record, and number of days since the last race event for each race candidate.

The ROM 158 also includes processor instructions for the CPU 156 which establish in the RAM 160 a memory object defining a wagering processor 168, and a memory object defining an account processor 170. The wagering processor 168 communicates with the handicapping buffer 162 and the odds buffer 164 and is configured for selecting one or more racing candidates for the wager in accordance with the handicapping data stored in the handicap buffer 162 and the odds data stored in the odds buffer 164. The wagering processor 166 is also configured to display the selected racing candidates on the multimedia display 134 after the racing candidates are selected.

In one variation (not shown), the user interface 136 includes a select button for initiating reselection of the racing candidates, and the wagering processor 166 is configured to reinitiate selection of racing candidates upon receipt of the reselection command from the user interface 136. In this variation, preferably the wagering processor 166 is configured with a number of different candidate selection algorithms, with each algorithm giving different weights to the various handicapping data, and is configured to use a different one of the selection algorithms after each reselection command received from the user interface 136. In this manner, the wagering processor 166 typically selects different racing candidates for each actuation of the select button.

The account processor 170 is in communication with the currency receiver 138, the card read/write device 142 and the account buffer 166, and is configured for crediting the wageror's wagering account with money received by the currency receiver 138. The account processor 170 is also configured to credit the wageror's account with credits stored on the electronic/magnetic-stripe card which is inserted in the card read/write device 142, and to update the wageror's wagering account in accordance with the amount wagered and the outcome of the selected race event.

The processing instructions also configure the CPU 156 to (1) receive a wager amount from the user interface 136 for the selected race event, (2) transmit to the race processing system 104 the wager amount together with the selected racing candidates. (3) subsequently display on the multimedia display 134 a video and audio stream of the race event received from the race processing system 104, and then (4) award a payout in accordance with the wager amount and the selected racing candidates. The details of the wagering process, as facilitated by the processing instructions of the CPU 116 and the processing instructions of the CPU 156, are explained in greater detail in FIG. 5.

Figure 5A:
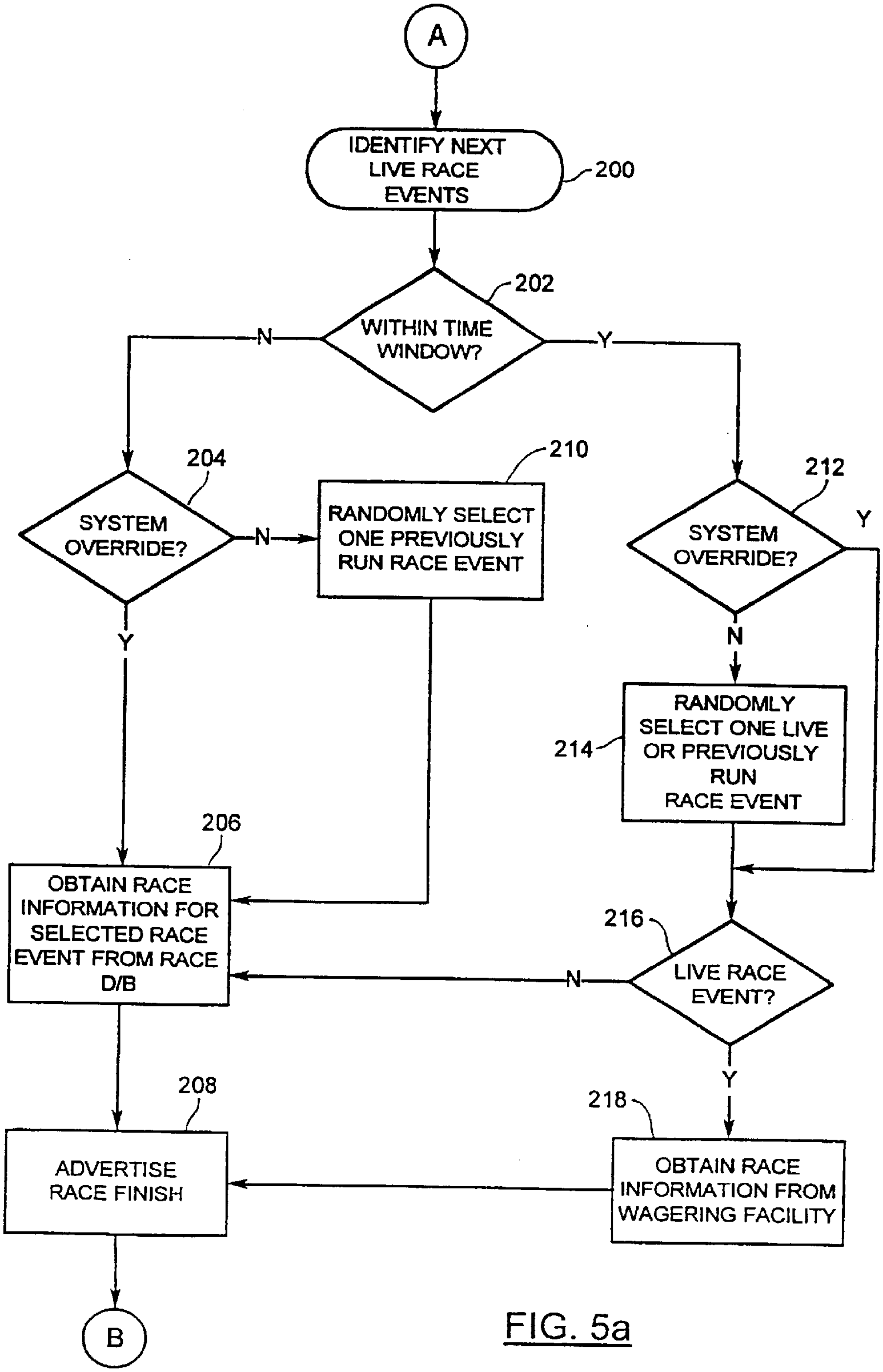
FIGS. 5*a*, 5*b*, and 5*c* comprise a flow chart describing the wagering steps facilitated by the multimedia wagering system.
Figure 5B:
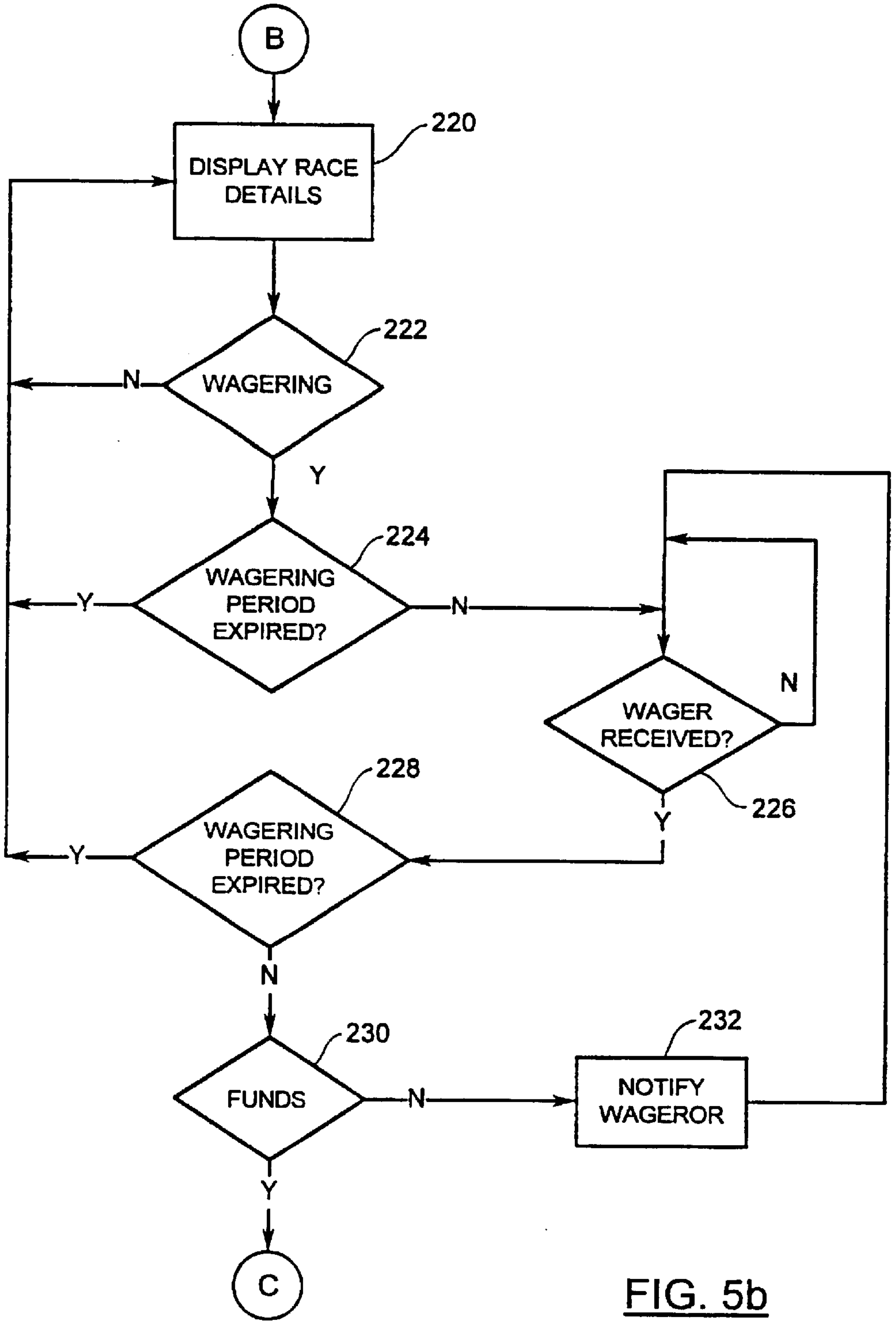
Figure 5C:
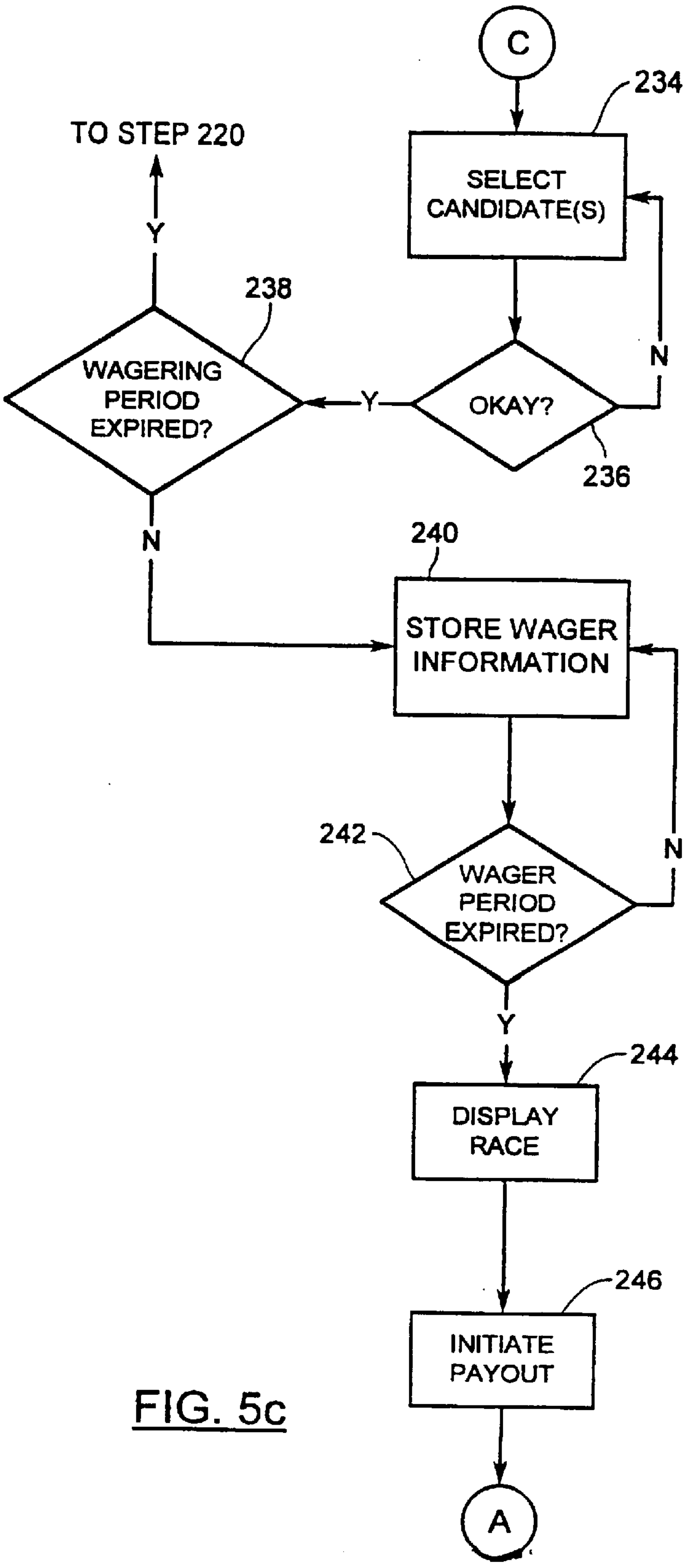

As shown in FIG. 5, at step 200 the race selector 128 queries the start times from the race event information received from the wagering facilities 102, and identifies the next live race events. At step 202, the race selector 128 determines whether any of the next live race events are scheduled to run within the next predetermined time window. Typically, the time window between the end of one race event and the start of the next race event is no more than a 120 seconds in order to increase wagering volume and to maintain the enthusiasm of the wagerors. Preferably, the time window between the end of one race event and the start of the next race event is no more than 15 seconds.

If no live race events are scheduled to run within the next predetermined time window, at step 204 the race selector 128 determines whether the system operator has input an override command, via data input device 124, instructing the race selector 128 to select a particular previously run race event. If an override command has been received from the data input device 124, at step 206 the race selector 128 accesses the race database 126 and retrieves the race track name and place of the selected previously-run race event, the name of each race candidate, the name of the jockey associated with each race candidate, and the odds and handicapping information for each race candidate. At step 208, the race selector 128 transmits to the wagering terminals 106 the extracted race information, together with start time information identifying the start time of the race event. As will be appreciated, some race events can only entertain certain forms of wagers. For instance, "Pick Two Exact Order"-type betting may not be permitted at the selected race event. Consequently, at step 208, the race selector 128 transmits the race information to only those wagering terminals 106 which are capable of placing wagers on the race event. However, in one variation, the system operator enters a configuration command via the data input device 110 to change the predetermined wager form of selected wagering terminals 106 to the wager form permitted at the selected race event, and the race selector 128 transmits (at step 128) the configuration command together with the race information to the selected wagering terminals 106.

If no override command has been received from the data input device 124, at step 210 the race selector 128 randomly selects one of the previously-run race events from the race database 126. Then, at step 206, the race selector 128 retrieves from the race database 126 the race track name and place of the selected previously-run race event, the name of each race candidate, the name of each jockey associated with each race candidate, and the odds and handicapping information for each race candidate. At step 208, the race selector 128 transmits to the wagering terminals 106 (which are capable of placing wagers on the race event) the extracted race information, together with start time information identifying the start time of the race event.

If, at step 202, the race selector 128 determines that at least one live race event is scheduled to run within the next predetermined time window, at step 212 the race selector 128 determines whether the system operator has input an override command via data input device 124, instructing the race selector 128 to display a particular live race event or a particular previously run race event. If no override command has been received from the data input device 124, at step 214 the race selector 128 randomly selects one of the live or previously-run race events. Then at step 216, the race selector 128 determines whether the selected race event is a live race event or a previously-run race event. If the race selector 128 determines that the selected race event is a previously-run race event, at step 206 the race selector 128 retrieves from the race database 126 the race track name and place of the selected previously-run race event, the name of each race candidate, the name of each jockey associated with each race candidate, and the odds and handicapping information for each race candidate. At step 208, the race selector 128 transmits to the wagering terminals 106 (which are capable of placing wagers on the race event) the extracted race information, together with start time information identifying the start time of the race event.

If the race selector 128 determines that the selected race event is a live race event, at step 218 the race selector 128 obtains from the associated wagering facility 102 the race track name and place of the selected race event, the name of each race candidate, the name of each jockey associated with each race candidate, the odds and handicapping information for each race candidate, and the start time of the race event. At step 208, the race selector 128 transmits the race information to the wagering terminals 106 which are capable of placing wagers on the race event.

If at step 212, the race selector 128 determines that an override command has been received from the data input device 124, at step 216 the race selector 128 determines whether the race event selected by the system operator is a live race event or a previously-run race event. If the race selector 128 determines that the selected race event is a previously-run race event, at step 206 the race selector 128 retrieves from the race database 126 the race track name and place of the selected previously-run race event, the name of each race candidate, the name of each jockey associated with each race candidate, and the odds and handicapping information for each race candidate. At step 208, the race selector 128 transmits to the wagering terminals 106 (which are capable of placing wagers on the race event) the extracted race information, together with start time information identifying the start time of the race event.

If the race selector 128 determines that the race event selected by the system operator is a live race event, at step 218 the race selector 128 obtains from the associated wagering facility 102 the race track name and place of the selected race event, the name of each race candidate, the name of each jockey associated with each race candidate, the odds and handicapping information for each race candidate, and the start time of the race event. At step 208, the race selector 128 transmits the race information to the wagering terminals 106 which are capable of placing wagers on the race event.

At step 220, each wagering terminal 106 (which is capable of placing wagers on the race event) displays on the multimedia display 134 the race track name and place of the selected race event, the name of each race candidate, the name of each jockey associated with each race candidate, and the odds for each race candidate. The data processor 152 may also change the predetermined wager form assigned to the wagering terminal 106 if the race selector 128 transmits a configuration command at step 208, so as to allow the wagering terminals to display the selected race event.

Each wagering terminal 106 also stores the received handicapping information in the handicap buffer 162, and stores the odds information in the odds buffer 164. The CPU 156 then begins counting down the time remaining until the start of the race event, and displays the time remaining on the multimedia display 134. The time remaining until the start of the race event is referred to herein as the "wagering period".

At step 222, the account processor 170 determines whether the wageror has deposited money into the currency receiver 138, or has inserted an electronic/magnetic-stripe wageror's card into the card read/write device 142, thereby establishing a wagering account in the account buffer 166. In one variation, the wagering terminal 106 is in communication with banking computers and the account processor 170 establishes a wagering account by electronically transferring funds from the wageror's bank account, after the wageror provides the account processor 170 with the appropriate PIN and bank account number, via the user interface 136.

If no wagering account has been established, the wagering terminal 106 continues to display the race information at step 220. On the other hand, if a wagering account has been established, at step 224 the account processor 170 determines whether the wagering period has expired. If the account processor 170 determines that the wagering period has expired, the wagering terminal 106 continues to display the race information at step 220. As will be apparent, since the race providing system 104 continuously updates the wagering terminals 106 with information on the next race event to be run, shortly after the wagering period expires the wagering terminal 106 will advise the wageror of the next race event.

If the account processor 170 determines that the wagering period has not expired, at step 226 the account processor 170 waits for a wager amount to be selected (via selection of one of the wager buttons 148). Once a wager amount is selected, at step 228 the account processor 170 determines whether the wagering period has expired. If the account processor 170 determines that the wagering period has expired, the wagering terminal 106 continues to display the race information at step 220. On the other hand, if the account processor 170 determines that the wagering period has not expired, at step 230 the wagering processor 170 queries the account buffer 166 to determine whether the wageror has sufficient funds in its wagering account for the wager. If the account processor 170 determines that the wagering account does not have sufficient funds for the wager, the account processor 170 displays a message on the multimedia display 134, requesting that the wageror insert more funds or place a smaller wager. The account processor 170 then waits for a new wager at step 226.

If the account processor 170 determines that the wagering account does have sufficient funds for the wager, at step 234 the wagering processor 168 queries the handicap buffer 162 and the odds buffer 164 to derive at a suitable race candidate (or candidates) for the wager, in accordance with the predetermined wager form assigned to the wagering terminal 106. The wagering processor 168 then displays the selected race candidates on the multimedia display 134 at step 236, and if the selected race candidates are deemed by the wageror to be unacceptable, the wageror can override the selection by directly selecting the desired race candidates using the touch sensitive membrane of the multimedia display 134. If the selected race candidates are deemed by the wageror to be acceptable, the wageror completes the wager by activation of the bet submission button 150.

At step 238, the account processor 170 then determines whether the wagering period has expired. If the account processor 170 determines that the wagering period has expired, the wagering terminal 106 waits for the next race event at step 220. If the account processor 170 determines that the wagering period has not expired, the wagering terminal 106 transmits the wager amount and the selected race candidate to the race providing system 104. The race providing system 104 stores the wager information in the wager database 132, together with the network address of the wagering terminal 106 at step 240.

As discussed above, in one variation the user interface 136 includes a select button for initiating selection of the racing candidates. Accordingly, in this variation, the wageror places a wager at step 226 by selecting one of the wager buttons 148 and activating the select button. If the race candidates are deemed by the wageror to be unacceptable, the wageror re-activates the select button, causing the wagering processor 168 to use an alternate algorithm for selecting the race candidates. Once the race candidates are deemed by the wageror to be acceptable, the wageror completes the wager by activating the bet submission button 150.

Alternately, as discussed above, in another variation, the user interface 136 includes a plurality of wager form buttons to allow the wageror to select a desired one of the predetermined wager forms. Accordingly, in this latter variation, the wageror places a wager at step 226 by selection of one of the wager buttons 148 and activation of the wager form button corresponding to the desired wager form.

The race providing system 104 continues to receive wagers until the end of the wagering period. Upon receipt of each wager, the race providing system 104 transmits the wager information to the wagering facilities 102. Once the wager processor 130 determines that the wagering period has expired (at step 242), the race providing system 104 transmits (at step 244) the selected race event to the wagering terminals 106 from which it has received wagers. Consequently, wagerors are encouraged to place wagerors on a race event in order to view the race. Since the race providing system 104 transmits the same race event to each wagering terminal 106 (which is capable of placing wagers on the race event), the bandwidth requirements for presenting the race are less than that of the prior art wagering systems. Consequently, wagerors are provided with a more exciting multimedia experience, thereby encouraging wagerors to place wagers on subsequent race events.

At the end of the race event (at step 246), the wager processor 130 queries the wager database 132 to identify the winning wagers, calculates the payout payable to each wageror in accordance with the amount wagered (and either the payout odds if the wager was a fixed odds wager, or the size of the parimutuel pool if the wager was a parimutuel wager), and then transmits to each winning wagering terminal 106 (using the network address stored in the wager database 132) a data packet indicating the payout amount. The race providing system 104 also transmits to the wagering terminals 106 a data packet identifying the names of the first four race candidates to finish the race event, and then proceeds to identify the next live race events at step 200.

Upon receipt of the winning candidate data packet, the CPU 156 displays on the multimedia display 134 the names of the first four race candidates to finish the race event. Upon receipt of the payout data packet, the account processor 170 updates the wageror's wagering account, as stored in the account buffer 166, and then updates the account information on the electronic or magnetic-stripe card (if present). The wageror can then place a wager on the next race event, or obtain a payout of the winnings by removing the electronic or magnetic-stripe card from the card read/write device 142. Alternately, if no electronic or magnetic-stripe card is used, the wageror can initiate a payout by sending a suitable command to the account processor 170 via the touch sensitive membrane of the multimedia display 134, thereby causing a cash payout via the currency dispensing device 140. In the variation where the wagering terminal 106 is in communication with banking computers, the wageror may also initiate payout to the wageror's bank account, after the wageror provides the account processor 170 with the appropriate PIN and bank account number, entered via the user interface 136.

The present invention is defined by the claims appended hereto, with the foregoing description being merely illustrative of the preferred embodiment of the invention. Those of ordinary skill may envisage certain additions, deletions and/or modifications to the described embodiment, which although not explicitly described herein, do not depart from the spirit or scope of the invention, as defined by the claims appended hereto.

I claim:

1. A multimedia wagering system comprising:

a race providing system facilitating wagering on race events, the race provider including a program for selecting next ones of the race events for the wagering to provide at least one selected race event; and at least one multimedia wagering terminal in communication with the race providing system for wagering on the at least one selected race events, each said wagering terminal including a multimedia display for displaying the selected race events, a user interface for placing a wager on the at least one selected one race event, payout provider for providing a payout on the at least one selected race events, and data processor in communication with the multimedia display, the user interface and the payout provider for facilitating wagering on the selected race events, wherein the data processor is configured with a program that automatically selects one or more racing candidates for the wager without candidate selection input by the user, the program selecting one or more racing candidates using at least one of handicapping data and odds associated with the selected race events to select the one or more racing candidates.

2. The wagering system according to claim 1, wherein the data processor includes at least one of a handicapping receiver for receiving the handicapping data from the race providing system and an odds receiver for the receiving odds data from the race providing system, and a wagering processor in communication therewith for selecting the one or more racing candidates in accordance with the at least one received handicapping data and received odds data.

3. The wagering system according to claim 2 wherein the user interface is configured so that the user can initiate reselection of the racing candidates selected by the wagering processor.

4. The wagering system according to claim 2 wherein the user interface is configured for providing the wager in only a single predetermined wager form.

5. The wagering system according to claim 2 wherein the user interface is configured for facilitating placement of the wager in accordance with one of a plurality of user-selectable predetermined wager forms.

6. The wagering system according to claim 1, wherein the payout means includes a currency receiver for receiving money, and an account processor coupled to the currency receiver for crediting a user account with the received money and for updating the user account in accordance with a wager amount and an outcome of each said wagered race event.

7. The wagering system according to claim 1, wherein race providing information includes race feeds from a plurality of race providers for displaying the race events on the multimedia displays in real time, a race database of previously run race events, and means for dynamically selecting the next one race event from the race feeds and the database.

8. The wagering system of claim 1 wherein selection by the data processor is made on the basis of both handicapping data and odds data.

9. The wagering system of claim 1 wherein handicapping data is used in the selecting of one or more racing candidates by the data processor and the handicapping data includes at least one datum selected from the group consisting of weather conditions, candidate age, win record, and number of days between races for the race contestant.

10. The multimedia wagering system of claim 1 wherein the program for selecting next ones of the race events for the wagering selects the event on a basis including an amount of time until a scheduled race is to be run.

11. The multimedia wagering system of claim 10 wherein the program for selecting the next ones of the race events does not include player capability to select a race event.

12. A multimedia wagering method, comprising the steps of:

providing a race providing system for facilitating wagering on race events, the race providing system including race feeds from at least one race provider for receiving from the race provider feeds of live information of at least one of the race events, and a race database of previously run ones of the race events;

wagering at least one wager amount;

providing a plurality of multimedia wagering terminals, each said wagering terminal being configured for accepting wagers and displaying the race events and for providing a payout on the race events;

at the race providing system, selecting one of the race events and transmitting to each said wagering terminal a notice of the selected one race event, the race event selecting step comprising a processor selecting one race event chosen between the live race events and the previously run race events in accordance with a start time of the live race events, the processor automatically selecting a contestant in the selected race event, without candidate selection input by the user, based on at least one of handicapping data and odds data during a wagering period, displaying on the at least one wagering terminals the selected one race event; and subsequent to the selected one race event, providing the payout in accordance with the wager amount and an outcome of the selected one race event.

13. The method according to claim 12 wherein the multimedia wagering terminals are each configured for providing the wager in only a single predetermined wager form, and the wager receiving step comprises receiving from the at least one wagering terminals the predetermined form wager.

14. The method according to claim 12, wherein the multimedia wagering terminal are each configured for providing the wager in accordance with one of a user-selectable predetermined wager forms, and the wager receiving step comprises receiving from the at least one wagering terminals the selected predetermined form wagers.

15. The method of claim 12 wherein selection by the data processor is made on the basis of both handicapping data and odds data.

16. The method of claim 12 wherein handicapping data is used in the selecting and the handicapping data includes at least one datum selected from the group consisting of weather conditions, candidate age, win record, and number of days between races for the race contestant.

17. The method of claim 12 wherein the selecting of the race event selects the race event on a basis including an amount time until a scheduled race is to be run.

18. The multimedia wagering system of claim 17 wherein the program for selecting the next ones of the race events does not include player capability to select a race event.

19. A multimedia wagering terminal comprising:

a connection to a wagering processor, the processor selecting a race event;

a multimedia display for receiving transmissions of race events from a race providing system;

a user interface for placing a wager on a selected race event, the wager at the terminal having a single predetermined wager form;

a payout provider for providing a payout on wagered race events; and a data processor in communication with i) the multimedia display, ii) the user interface and iii) the payout provider the data processor facilitating wagering on the selected race events with the race providing system by automatically selecting one or more racing candidates for the wager, without candidate selection input by the user, based on at least one of handicapping and odds data.

20. The wagering terminal according to claim 19, wherein the data processor includes at least one of the handicapping receiver for receiving handicap data from the race providing system and an odds receiver for receiving odds data from the race providing system, and a wagering processor in communication therewith for selecting the one or more racing candidates in accordance with the at least one received handicapping data and received odds data.

21. The wagering terminal according to claim 20, wherein the user interface is configured for initiating reselection of at least one racing candidates by the wagering processor upon activation of reselection by the user, reselection effected by use of an algorithm that is different from an algorithm used in the selecting of the one or more racing candidates.

22. The wagering terminal according to claim 19, wherein the user interface is configured for preventing a user selection of the race event.

23. The wagering terminal according to claim 19, wherein the payout provider includes a currency receiver for receiving money, and an account processor coupled to the currency receiver for crediting a user account with the received money and for updating the user account in accordance with a wager amount and an outcome of each said elected race event.

24. The multimedia wagering terminal of claim 19 wherein facilitating wagering on the selected race events with the race providing system is made on the basis of at least one of handicapping data and odds data.

25. The multimedia wagering terminal of claim 24 wherein selection by the data processor is made on the basis of both handicapping data and odds data.

26. The multimedia wagering system of claim 24 wherein handicapping data is used in the selecting by the data processor and the handicapping data includes at least one datum selected from the group consisting of weather conditions, candidate age, win record, and number of days between races for the race contestant.

27. The multimedia wagering terminal of claim 19 wherein selecting the race event selects the event on a basis including an amount of time until a scheduled race is to be run.

28. The multimedia wagering terminal of claim 27 wherein the selecting of the next race event does not include player capability to select a race event.

29. A multimedia wagering terminal comprising:

a multimedia display for receiving transmissions of race events from a race providing system;

a user interface for placing a wager on selected ones of the race events;

a data processor in communication with the multimedia display, the user interface and a payout means for facilitating wagering on the selected race events with the race providing system, the data processor being configured to automatically select one or more racing candidates for the wager, without candidate selection input by the user, in accordance with at least one of handicapping data and odds data associated with the selected race events.

30. The wagering terminal according to claim 29, wherein the data processor includes at least one of a handicapping receiver for receiving odds data from the race providing system, and a wagering processor in communication therewith that selects one or more racing candidates for the wager in accordance with the at least one of handicapping data and odds data associated with the selected race events.

31. The wagering terminal according to claim 29, wherein the user interface is configured for initiating reselection of the racing candidates by the wagering processor when reselection is initiated by the user.

32. The wagering terminal according to claim 29, wherein the wagering processor is configured for providing the wager in only a single predetermined wager form.

33. The wagering terminal according to claim 29, wherein the wagering processor is configured for facilitating placement of the wager in accordance with one of a plurality of user-selectable predetermined wager forms.

34. The multimedia wagering terminal of claim 29 wherein selection by the data processor is made on the basis of both handicapping data and odds data.

35. The multimedia wagering system of claim 34 wherein handicapping data is used in the selecting by the data processor and the handicapping data includes at least one datum selected from the group consisting of weather conditions, candidate age, win record, and number of days between races for the race contestant.

36. The multimedia wagering terminal of claim 29 wherein selecting the race event selects the event on a basis including an amount of time until a scheduled race is to be run.

37. The multimedia wagering terminal of claim 36 wherein the selecting of the next race event does not include player capability to select a race event.

38. A multimedia wagering system comprising:

a video medium;

an audio medium;

a race providing system facilitating wagering on race events, the race providing system including a program for selecting at least one next race event for the wagering to provide an at least one selected race event; and at least one multimedia wagering terminal providing the video medium and the audio medium in communication with the race providing system for wagering on the at least one selected race events, each said wagering terminal including a) a multimedia display for displaying results of the selected race events, b) a user interface for placing a wager on the at least one selected one race event, c) a payout provider for providing a payout on the at least one selected race events, and d) a data processor in communication with the multimedia display, the user interface and the payout provider, the data processor facilitating wagering on the selected race events, wherein the data processor is configured to automatically select one or more racing candidates for the wager, without candidate selection input by the user, selecting one or more racing candidates being performed by at least one algorithm using at least one of handicapping data and odds associated with the selected race events.

39. The multimedia wagering system of claim 38 wherein selecting one or more racing candidates is performed by at least one algorithm on the basis of both handicapping data and odds data.

40. The multimedia wagering system of claim 38 wherein the program for selecting next ones of the race events for the wagering to provide at least one selected race event selects the event on a basis including an amount of time until a scheduled race is to be run.

41. The multimedia wagering system of claim 40 wherein the program for selecting the next ones of the race events does not include player capability to select a race event.

42. A multimedia wagering system comprising:

a race providing system facilitating wagering on race events, the race provider including a program for selecting next ones of the race events for the wagering to provide at least one selected race event; and at least one multimedia wagering terminal in communication with the race providing system for wagering on the at least one selected race events, each said wagering terminal including a multimedia display for displaying the selected race events, a user interface for placing a wager on the at least one selected one race event, payout provider for providing a payout on the at least one selected race events, and data processor in communication with the multimedia display, the user interface and the payout provider for facilitating wagering on the selected race events, wherein the data processor is configured with a program including at least a first race candidate selection algorithm that automatically selects one or more racing candidates for the wager, without candidate selection input by the user, based upon at least one of handicapping data and odds data.

43. The system of claim 42 wherein the at least a first race candidate selection algorithm that selects one or more racing candidates for the wager selects one or more racing candidates using at least one of handicapping data and odds associated with the selected race events to select the one or more racing candidates.

44. The system of claim 43 wherein the data processor is configured with more than one race candidate selection algorithm.

45. The system of claim 42 the data processor is configured with more than one race candidate selection algorithm.

46. The system of claim 45, wherein there is a user interface that enables the user to perform a reselection process to eliminate the one or more racing candidates selected and causes the data processor to use a second race contestant selection algorithm to select at least one or more racing candidates.

47. The system of claim 42 wherein there is a user interface that enables the user to perform a reselection process to eliminate the one or more racing candidates selected and causes the data processor to use a second race candidate selection algorithm to select at least one or more racing candidates.

48. The system of claim 42 wherein more than one race candidate is selected by the first race candidate selection algorithm and the user may select a race candidate from among the more than one race candidate.

* * * * *